United States Patent
Mastenbrook

(10) Patent No.: US 6,771,166 B2
(45) Date of Patent: Aug. 3, 2004

(54) AIR BAG DEPLOYMENT SENSING APPARATUS AND METHOD

(75) Inventor: Gary E. Mastenbrook, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 42 days.

(21) Appl. No.: 09/993,535

(22) Filed: Nov. 14, 2001

(65) Prior Publication Data

US 2003/0090370 A1 May 15, 2003

(51) Int. Cl.$^7$ ................................................. B60Q 1/00
(52) U.S. Cl. .................... 340/425.5; 340/436; 340/438; 340/446; 340/566; 280/734; 280/735; 367/197; 367/199
(58) Field of Search ............................. 340/425.5, 436, 340/438, 446, 447, 426.2, 566; 280/734, 735; 367/197, 199; 381/56, 86; 73/570

(56) References Cited

U.S. PATENT DOCUMENTS

| | | | | |
|---|---|---|---|---|
| 5,574,427 A | * | 11/1996 | Cavallaro | .................... 340/436 |
| 6,124,784 A | * | 9/2000 | Wells | ......................... 340/438 |
| 6,305,708 B2 | * | 10/2001 | Davis et al. | ................. 280/735 |
| 6,339,370 B1 | * | 1/2002 | Ruhl et al. | ................... 340/436 |
| 6,438,475 B1 | * | 8/2002 | Gioutsos | ..................... 340/436 |

* cited by examiner

Primary Examiner—Daniel J. Wu
Assistant Examiner—Daniel Previl
(74) Attorney, Agent, or Firm—Kevin D. Wills

(57) ABSTRACT

In a vehicle (102) a method of detecting air bag (106) deployment includes detecting an acoustic energy level increase (150) and developing a spectral content (502) of the increase. Further comparing the spectral content (502) to a template (134) and if spectral content (502) correlates to template (134), outputting an air bag deployment signal (138). An apparatus for detecting air bag deployment includes a means for detecting an acoustic energy level increase (150) in a vehicle (102), a spectral content (502) of the acoustic energy level increase (150) and a template (134), where the spectral content (502) is compared to template. An air bag deployment signal (138) is outputted if the spectral content (502) correlates to the template (134).

34 Claims, 3 Drawing Sheets

100

200

AIR BAG DEPLOYMENT SENSING APPARATUS AND METHOD

BACKGROUND OF THE INVENTION

Automated emergency call response systems in vehicles respond to a crash event by automatically notifying emergency response personnel such as police, fire departments, etc. Generally, the automated response system is triggered by the activation of the vehicle supplemental restraint (air bag) system. Prior art Original Equipment Manufacturer (OEM) systems incorporate a connection to either the vehicle OEM electrical bus or a direct connection to the air bag system itself to allow status monitoring of the air bag system in normal operation and notification to an emergency communication system in the event an air bag is deployed.

In the aftermarket vehicle situation, the many different types of vehicle electrical bus configurations and air bag systems precludes the safe and effective connection of an automated emergency call response system to provide the monitoring function. Disadvantages of prior art after market devices include accidental air bag deployment during installation and testing, intermittent connections, accidental damage to the air bag system, and the myriad of OEM electrical buses, which makes standardization of such a device difficult.

Prior art after market devices monitor the vehicle passenger compartment for a single acoustic frequency indicative of air bag deployment along with direct feedback from an accelerometer to indicate that the vehicle as been in an accident and to summon emergency aid. This prior art system has the disadvantage of requiring feedback from an accelerometer due to the monitoring of only a single frequency or impulse to indicate air bag deployment, without which can lead to false alarms and erroneous calls for emergency aid. The use of an accelerometer has the further disadvantage of the air bag detection system requiring feedback from an external device, which adds complexity and cost to the system.

Accordingly, there is a significant need for a method for an air bag deployment sensing apparatus and method that overcomes the deficiencies of the prior art outlined above.

BRIEF DESCRIPTION OF THE DRAWINGS

Referring to the drawing.

Figure 1:
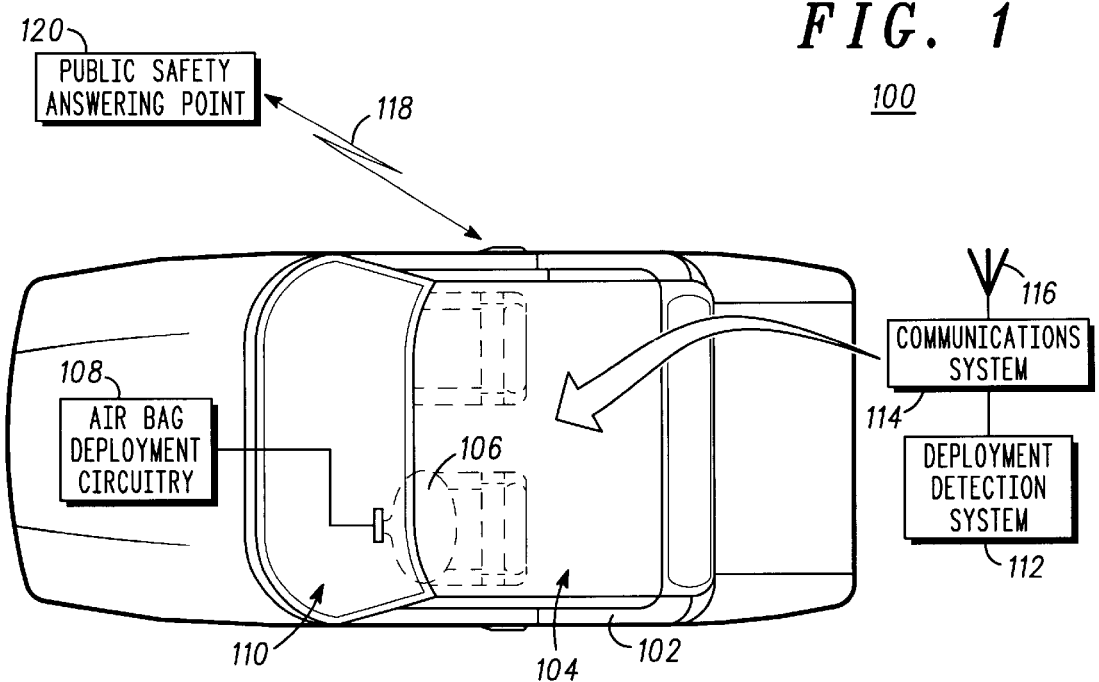
FIG. 1 is a block diagram of a deployment detection system in a vehicle according to an embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact. However, "coupled" may also mean that two or more elements are not in direct contact with each other, but yet still co-operate or interact with each other.

For clarity of explanation, the illustrate embodiments of the present invention is presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 is a block diagram 100 of a deployment detection system in a vehicle 102 according to an embodiment of the invention. As shown in FIG. 1, vehicle 102 is equipped with an air bag system 110, which includes an air bag 106 and air bag deployment circuitry 108. Air bags 106 and air bag deployment circuitry 108 are known in the art.

A deployment detection system 112 separate and independent from air bag system 110 is also shown in FIG. 1. Portions of deployment detection system 112 are located within the passenger compartment 104 of vehicle, while other portions may or may not be located within passenger compartment 104 as will be discussed below. Deployment detection system 112 operates independently of air bag system 110 to detect air bag 106 deployment. In one embodiment of the invention, deployment detection system 112 is coupled to communications system 114 having an antenna 116 for communicating via a wireless link with other communications systems external to vehicle 102. In the present embodiment, deployment detection system 112 operates to activate communications system 114 in response to an air bag deployment signal received from deployment detection system 112. Communications system 114 may further transmit an emergency signal 118 to Public Safety Answering Point (PSAP), which can include an emergency response center, police department, fire department, 911 operator, position information of the vehicle, and the like. Emergency signal 118 can be a one or two way signal and may include voice, data, and the like.

In an embodiment of the invention, deployment detection system 112 and communications system 114 can be part of a Telematics system integrated into vehicle, where Telematics system includes, among other things, an integrated in-vehicle wireline and wireless communications system that operates to communicate content to and from vehicle through wireless means. Telematics systems are known in the art. In another embodiment, deployment detection system 112 can be incorporated into any electronic device, for example, a cellular telephone, laptop computer, Personal Digital Assistant (PDA), and the like, for portability in different vehicles. Deployment detection system 112 can operate in conjunction with a communications system 114 that is already integrated into vehicle 102 or operate with it's own communications system 114 integral with deployment detection system 112 or a device in which deployment detection system 112 is installed.

Figure 2:
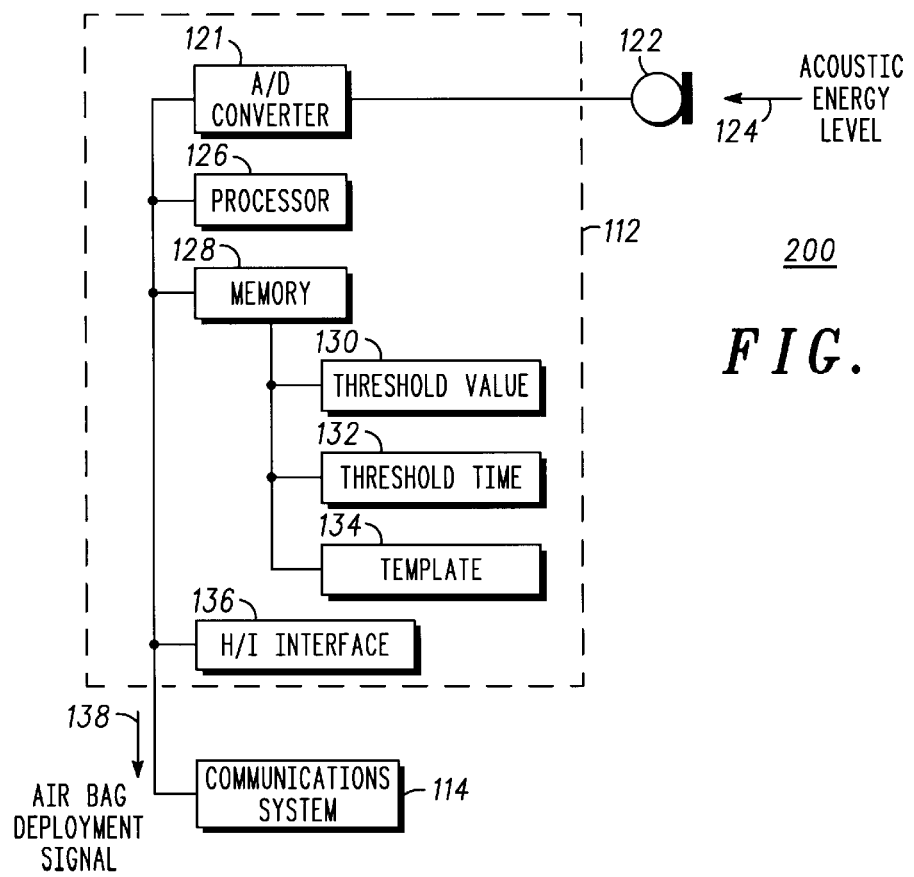
FIG. 2 is a block diagram of the deployment detection system of FIG. 1 according to an embodiment of the invention.

FIG. 2 is a block diagram 200 of the deployment detection system 112 of FIG. 1 according to an embodiment of the invention. As shown in FIG. 2, deployment detection system 112 includes a microphone 122 coupled to receive monitor the acoustic energy level 124 in the passenger compartment 104 of vehicle 102. Any means for detecting an acoustic energy level rise in vehicle 102 is within the scope of the invention, and the invention is not limited to the use of a microphone 122. As described above, microphone 122 can be part of a vehicle Telematics system or integrated with another electronic device independent of vehicle 102 or a Telematics system. Microphone is located in the passenger compartment 104 of vehicle, while other portions of deployment detection system 112 can be located either in or outside of the passenger compartment 104.

Microphone 122 provides an electrical signal, which reflects the acoustic energy level 124 and frequencies of acoustic energy level 124 within passenger compartment. Acoustic energy level corresponds to an amplitude of an electrical signal. Microphone 122 can monitor acoustic energy level 124 during times in which any electronic device into which microphone is incorporated is inactive or active. In other words, acoustic energy level 124 may be monitored while microphone is in use, for example, as in a cellular phone, and the like, and also while the microphone 122 is not used for its intended purpose. In another embodiment, deployment detection system 112 can have a dedicated microphone 122 to monitor acoustic energy level 124. Microphone 122 is monitored any time vehicle 102 is in use, even while being used as an audio input as part of another electronic device's normal operation.

Deployment detection system 112 monitors acoustic energy level 124 received from microphone 122 for an acoustic energy level (amplitude) indicative of an air bag deployment. In an embodiment of the invention, deployment detection system 112 includes an analog to digital converter (A/D) and a processor 126 for processing algorithms stored in memory 128. Memory 128 comprises control algorithms, and can include, but is not limited to, random access memory (RAM), read only memory (ROM), flash memory, electrically erasable programmable ROM (EEPROM), and the like. Memory 128 can contain stored instructions, tables, data, and the like, to be utilized by processor 126. In an embodiment of the invention, memory 128 contains, among other things, a threshold value 130, threshold time 132 and a template 134 as described below. Deployment detection system 112 can optionally include human interface (H/I) elements 136.

Human interface (H/I) elements 136 comprise elements such as a display, a multi-position controller, one or more control knobs, one or more indicators such as bulbs or light emitting diodes (LEDs), one or more control buttons, one or more speakers, a microphone, and any other H/I elements required by wireless device. The invention is not limited by the (H/I) elements described above. As those skilled in the art will appreciate, the (H/I) elements outlined above are meant to be representative and to not reflect all possible (H/I) elements that may be employed.

Deployment detection system 112 is coupled to communications system 114, where communications system 114 is coupled to receive an air bag deployment signal 138 from deployment detection system 112. Acoustic energy level 124 is monitored and sampled via microphone 122 and converted to a digital signal by A/D converter 121. When deployment detection system detects an acoustic energy level increase (as described below) for a threshold time 132, the acoustic energy level increase is compared to a threshold value 130. If the acoustic energy level increase correlates to threshold value 130, a spectral content (described below) is developed of a sampled portion of acoustic energy level 124, where sampled portion includes the acoustic energy level increase. If the spectral content matches a template 134, which indicates air bag 106 deployment, then air bag deployment signal 138 is outputted to communications system 114. This process is described more fully below in conjunction with FIGS. 3, 4 and 5.

Software blocks that perform embodiments of the invention are part of computer program modules comprising computer instructions, such as control algorithms, that are stored in a computer-readable medium such as memory described above. Computer instructions can instruct processors to perform methods for sensing air bag deployment. In other embodiments, additional modules could be provided as needed.

Figure 3:
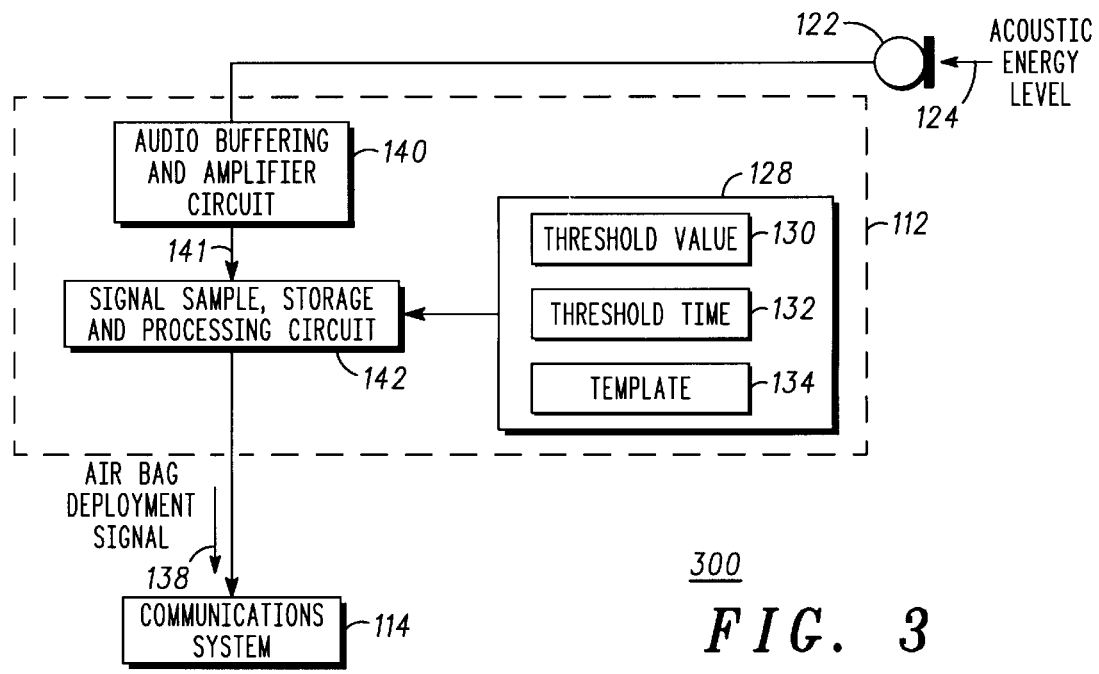
FIG. 3 is a block diagram of a deployment detection system according to an embodiment of the invention.
Figure 4:
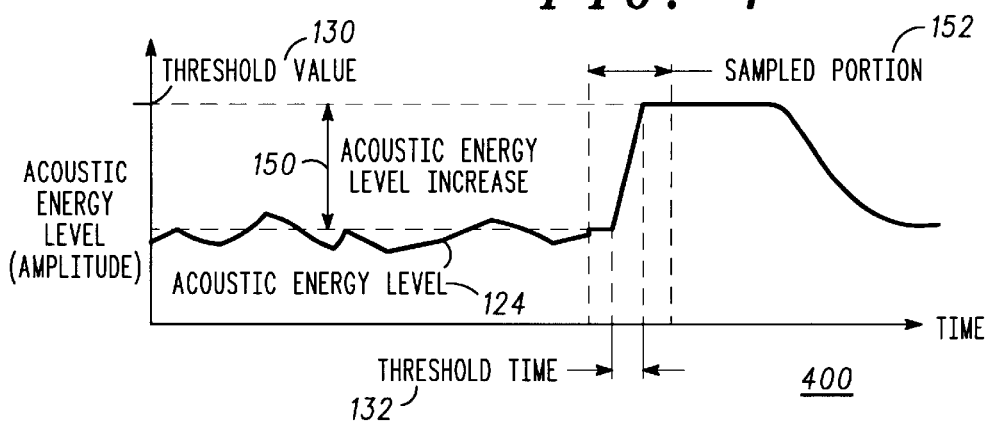
FIG. 4 is graph of acoustic energy level versus time according to an embodiment of the invention.

FIG. 3 is a block diagram 300 of a deployment detection system 112 according to an embodiment of the invention. FIG. 3 illustrates a more specific implementation of the embodiment of the invention depicted in FIG. 2. FIG. 4 is graph 400 of acoustic energy level 124 versus time according to an embodiment of the invention. As shown in FIG. 3, deployment detection system 112 includes, among other things, an audio buffering and amplifier circuit 140, which is coupled to receive acoustic energy level 124 as monitored by microphone 122. Audio buffering and amplifier circuit 140 operates to digitize and buffer acoustic energy level 124 signal received from microphone 122. Signal sample, storage and signal processing circuit 142 operates to receive the digitized signal 141 and to monitor for an acoustic energy level increase 150. As shown in FIG. 4, acoustic energy level 124 in vehicle passenger compartment 104 changes with the ambient "noise" or "sound" level within the compartment 104. An acoustic energy level increase 150 is a fast amplitude transient that may or may not lead to a saturation condition in the signal processing circuit 142.

In the embodiment shown in FIG. 4, acoustic energy level increase 150 is a fast transient that reaches a threshold value 130 in a threshold time 132, which is a saturation condition of the signal processing circuit 142. However, the invention is not limited to threshold value 130 being a saturation condition, which may never be reached. In another embodiment of the invention, threshold value may correspond to a specified slope, value, and the like, of the acoustic energy level 124 signal.

Threshold value is set to correspond to a value, slope, saturation condition, and the like, which indicates air bag 106 deployment. If acoustic energy level increase 150 correlates to threshold value 130, a "probable air bag deployment detection" state is set. A sampled portion 152 of acoustic energy level 124 is compared to threshold value 130 to determine if the "probable air bad deployment detection state" is set. Sampled portion 152 includes acoustic energy level increase 150. In another embodiment of the invention, sampled portion 152 includes samples from one or both sides of the acoustic energy level increase 150. In order to mitigate false alarms from inadvertent acoustic energy level increases within the passenger compartment from giving false alarms, a secondary processing function operates to verify that the air bag 106 has in fact deployed.

Figure 5:
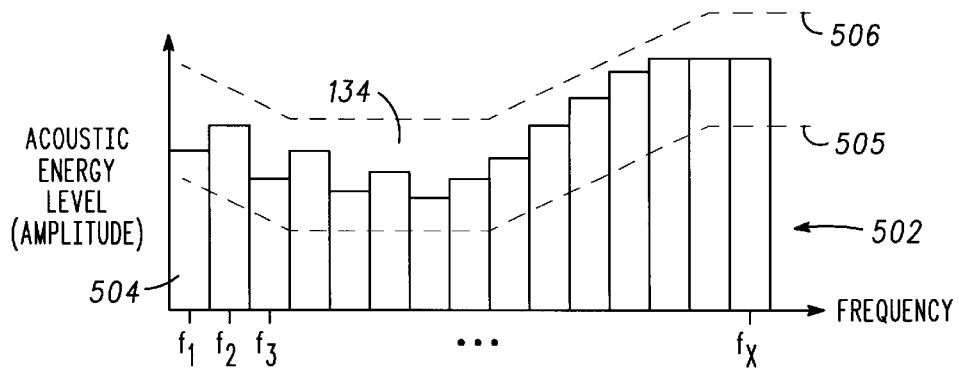
FIG. 5 is a spectral content graph and a template according to an embodiment of the invention.

FIG. 5 is a spectral content graph 500 and a template 134 according to an embodiment of the invention As described above, if a "probable air bag deployment detection" state is set, within deployment detection system 112, a secondary processing function operates to verify air bag 106 deployment by analyzing a digitized sample portion 152 of acoustic energy level 124. Sampled portion 152 includes acoustic energy level increase 150. Secondary processing function develops a spectral content 502 of sampled portion 152 by converting the sampled portion 152 of the amplitude versus time acoustic energy level 124 graph of FIG. 4 to a frequency vs. acoustic energy level (amplitude) graph of FIG. 5, which is a spectral content 502 of sampled portion 152.

In an embodiment of the invention, time-to-frequency analysis can be accomplished through the use of a Discrete Fourier Transform (DFT) analysis. However, the invention is not limited to the use of DFT, and any time-to-frequency method of analysis may be used and is within the scope of the invention.

In effect, sampled portion 152 is divided up into a series of "frequency bins" 504, each representing a discrete frequency ($f_1$, $f_2$, $f_3$ ... $f_x$) of sampled portion 152 with its corresponding acoustic energy level 124 (amplitude) value. The number of frequency bins 504 is related to the number of samples in sampled portion 152 used for the secondary processing function. The larger the number of frequency bins 504 used, the greater the resolution of sampled portion 152 and hence the greater the accuracy of the analysis. The resultant graph is the spectral content 502 of sampled portion 152 and accordingly, the spectral content 502 of acoustic energy level increase 150.

As shown in FIG. 5, spectral content 502 is compared to template 134, which comprises an upper signal amplitude threshold 506 and a lower signal amplitude threshold 505. Upper 506 and lower thresholds 505 comprise a series of small thresholds corresponding to each of the frequency bins 504 in spectral content 502. The series of thresholds, both upper and lower, combine to create template 134. If the amplitude of each, or a specified percentage, of frequency bins of spectral content 502 falls within the range between the upper 506 and lower threshold 505, spectral content 502 correlates to template 134 as defined by upper 506 and lower thresholds 505. This correlation verifies that the "probable air bag deployment detection" state set above is valid and air bag deployment signal 138 is outputted by deployment detection system 112.

Template 134 is preprogrammed into deployment detection system 112 and may represent an air bag acoustic signature of a particular model of air bag 106 deployed within a particular vehicle 102. Template 134 can be mapped for any model of air bag 106 installed and deployed within any type or model of vehicle by means known to those skilled in the art. Templates for different vehicles 102 and air bag 106 combinations can be preprogrammed into deployment detection system 112 so as to be portable with a user any vehicle he or she might occupy. Upper 506 and lower thresholds 505 of template 134 can be set as desired to account for the resolution of spectral content 502 as represented by the number of frequency bins 504 used and the amount of variation in acoustic energy level (amplitude) of each frequency bin 504 for a given set of conditions such as type of vehicle, model of air bag, number of air bags, and the like. In another embodiment of the invention, template 134 can be defined as a single set of amplitudes for a given frequency bin 504, therefore eliminating the use of upper 506 and lower thresholds 505.

In another embodiment of the invention, only a lower threshold 505 may be required and any specified percentage of frequency bins exceeding the lower threshold 505 may be sufficient to correlate spectral content 502 to template 134. The template shown in FIG. 5 is exemplary and not meant to limit the scope of the invention. Any type of template including different acoustic energy levels, spacing and number of frequency bins are within the scope of the invention.

In an embodiment of the invention, if "probable air bag deployment detection" state is verified through spectral content 502 matching template 134 as described above, deployment detection system 112 activates communications system 114 by outputting air bag deployment signal 138. Once communications system 114 receives air bag deployment signal 138, communications system 114 may transmit emergency signal 118 as described above.

Figure 6:
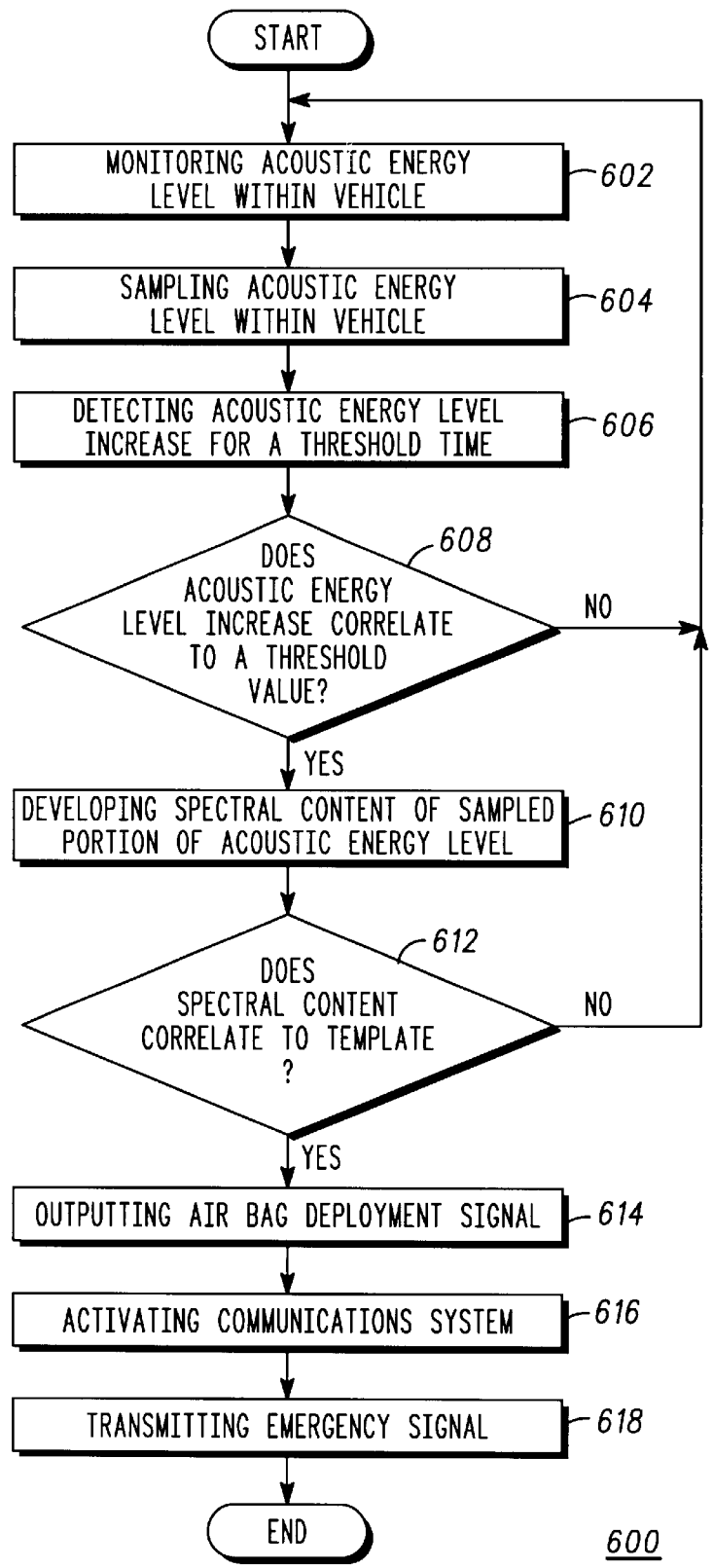
FIG. 6 illustrates a flow diagram of the method of the invention according to an embodiment of the invention.

FIG. 6 illustrates a flow diagram 600 of the method of the invention according to an embodiment of the invention. In step 602, acoustic energy level 124 is monitored within the passenger compartment 104 of vehicle 102. In step 604, acoustic energy level 124 is sampled within passenger compartment 104 of vehicle 102. In an embodiment of the invention, acoustic energy level 124 is monitored and sampled continuously while vehicle 102 is in use or there are occupants in passenger compartment 104.

In step 606, an acoustic energy level increase 150 is detected in passenger compartment 104. In an embodiment of the invention, acoustic energy level increase 150 is detected for a threshold time 132. In step 608 it is determined if acoustic energy level increase 150 correlates to a threshold value 130. If it doesn't, then deployment detection system 112 continues monitoring and sampling acoustic energy level 124 within passenger compartment 104 as indicated by the return arrow to step 602. If acoustic energy level increase 150 does correlate to threshold value 130, either a saturation value, slope value, or a value, and the like, as described above, then secondary processing function begins and a spectral content 502 is developed of sampled portion 152 per step 610.

In step 612, spectral content 502 is compared to template 134, wherein template may be an air bag deployment acoustic signature, to determine if spectral content 502 correlates to template 134. If not, deployment detection system 112 continues monitoring and sampling as indicated by the return arrow to step 602. If there is a correlation, deployment detection system 112 outputs an air bag deployment signal 138 per step 614. In step 616, air bag deployment signal 138 may be used to activate communications system 114, which can in turn transmit emergency signal 118 to a PSAP per step 618.

The method and apparatus of the invention has numerous advantages. One advantage is that air bag deployment is detected independently of the air bag system so that no connection to a vehicle electrical bus or air bag system is required. This allows the method and apparatus of the invention to be used as an after market air bag deployment detection system in any vehicle with any type of air bag.

Another advantage is that the method and apparatus of the invention can be implemented in either an existing Telematics system, an after market Telematics system, or in any electronic device that is microphone capable. This provides an inexpensive and convenient method of adding an air bag deployment detection system to any vehicle and makes the invention portable to any vehicle that a user might occupy. Another advantage of the invention is that it does not require a signal from an onboard accelerometer, further adding to the convenience and portability of the method and apparatus of the invention.

While we have shown and described specific embodiments of the present invention, further modifications and improvements will occur to those skilled in the art. It is therefore, to be understood that appended claims are intended to cover all such modifications and changes as fall within the true spirit and scope of the invention.

What is claimed is:

1. In a vehicle, a method of detecting air bag deployment, comprising:
   detecting an acoustic energy level increase;
   developing a spectral content of the acoustic energy level increase;
   comparing the spectral content to a template; and
   outputting an air bag deployment signal if the spectral content correlates to the template.

2. The method of claim 1, further comprising comparing the acoustic energy level increase to a threshold value.

3. The method of claim 2, wherein developing the spectral content comprises developing the spectral content if the acoustic energy rise time correlates to the threshold value.

4. The method of claim 1, further comprising monitoring an acoustic energy level within the vehicle.

5. The method of claim 1, wherein detecting an acoustic energy level increase comprises detecting an acoustic energy level increase for a threshold time.

6. The method of claim 1, wherein detecting the acoustic energy level increase comprises monitoring a microphone.

7. The method of claim 1, wherein the template corresponds to an air bag deployment acoustic signature.

8. The method of claim 1, further comprising activating a communications system in response to the air bag deployment signal.

9. The method of claim 8, wherein activating the communications system comprises transmitting an emergency signal.

10. The method of claim 1, further comprising detecting air bag deployment independent of an air bag system.

11. In a vehicle, a method of detecting air bag deployment, comprising:
    continuously monitoring and sampling an acoustic energy level within the vehicle;
    detecting an acoustic energy level increase;
    comparing a sampled portion of the acoustic energy level to a threshold value, wherein the sampled portion comprises the acoustic energy level increase;
    if the sampled portion correlates to the threshold value, developing a spectral content of the sampled portion;
    comparing the spectral content to a template; and
    outputting an air bag deployment signal if the spectral content correlates to the template.

12. The method of claim 11, wherein detecting the acoustic energy level increase comprises detecting the acoustic energy level increase for a threshold time.

13. The method of claim 11, wherein continuously monitoring comprises continuously monitoring and sampling through a microphone.

14. The method of claim 11, wherein the template corresponds to an air bag deployment acoustic signature.

15. The method of claim 11, further comprising activating a communications system in response to the air bag deployment signal.

16. The method of claim 11, further comprising detecting air bag deployment independent of an air bag system.

17. A vehicle having an apparatus for detecting air bag deployment, comprising:
    a means for detecting an acoustic energy level increase in a vehicle;
    a spectral content developed from of the acoustic energy level increase;
    a template, wherein the spectral content is compared to the template; and
    an air bag deployment signal, wherein the airbag deployment signal is outputted if the spectral content correlates to the template.

18. The apparatus of claim 17, further comprising a threshold value, wherein the spectral content is developed if the acoustic energy level increase correlates to the threshold value.

19. The apparatus of claim 17, wherein the means for detecting the acoustic energy level increase monitors an acoustic energy level in the vehicle.

20. The apparatus of claim 17, wherein the acoustic energy level increase is detected for a threshold time.

21. The apparatus of claim 17, wherein the template corresponds to an air bag deployment acoustic signature.

22. The apparatus of claim 17, wherein the air bag deployment signal activates a communications system.

23. The apparatus of claim 17, wherein the air bag deployment signal causes the transmission of an emergency signal.

24. The apparatus of claim 17, wherein the air bag deployment is detected independent of an air bag system.

25. A computer-readable medium containing computer instructions for instructing a processor to perform in a vehicle, a method of detecting air bag deployment, the instructions comprising:
    detecting an acoustic energy level increase;
    developing a spectral content of the acoustic energy level increase;
    comparing the spectral content to a template; and
    outputting an air bag deployment signal if the spectral content correlates to the template.

26. The method of claim 25, further comprising comparing the acoustic energy level increase to a threshold value.

27. The method of claim 26, wherein developing the spectral content comprises developing the spectral content if the acoustic energy rise time correlates to the threshold value.

28. The method of claim 25, further comprising monitoring an acoustic energy level within the vehicle.

29. The method of claim 25, wherein detecting an acoustic energy level increase comprises detecting an acoustic energy level increase for a threshold time.

30. The method of claim 25, wherein detecting the acoustic energy level increase comprises monitoring a microphone.

31. The method of claim 25, wherein the template corresponds to an air bag deployment acoustic signature.

32. The method of claim 25, further comprising activating a communications system in response to the air bag deployment signal.

33. The method of claim 32, wherein activating the communications system comprises transmitting an emergency signal.

34. The method of claim 25, further comprising detecting air bag deployment independent of an air bag system.

* * * * *